Figure 1:
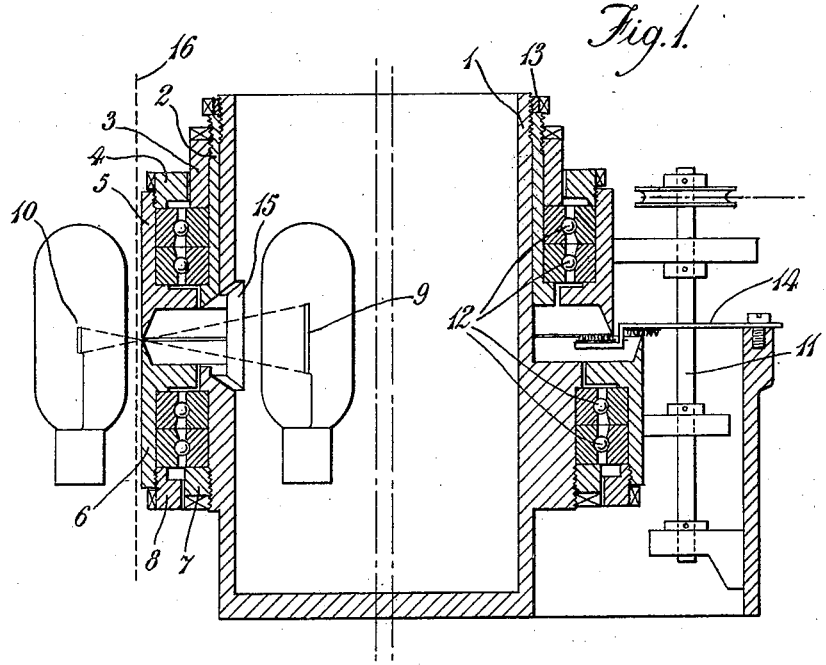

April 11, 1933.  H. B. STOCKS  1,903,637

REPRODUCTION OF SOUNDS

Filed March 28, 1931

INVENTOR
Harry B. Stocks.

By Lacey & Lacey
Attys

Patented Apr. 11, 1933                                                                 1,903,637

UNITED STATES PATENT OFFICE

HARRY BENWELL STOCKS, OF SOUTH TOTTENHAM, ENGLAND, ASSIGNOR TO ALFRED JAMES MUNRO AND THEODORE DARCH PARKIN, BOTH OF LONDON, ENGLAND

REPRODUCTION OF SOUNDS

Application filed March 28, 1931, Serial No. 526,088, and in Great Britain March 28, 1930.

The objects of this invention are the providing or furnishing of means whereby the aperture or slit through which light is projected on and through the so-called sound track of a cinematograph film may be adjusted or arranged in width to any desired amount and also to provide means for keeping the said aperture or slit free from foreign matter, such as dust or particles in air, which foreign matter would tend to close or to block the aperture or slit and so more or less to interfere with light reaching the sound track of the film.

In carrying out my invention, I provide a suitable means of illumination, and the light provided therefrom may be projected on the aperture or slit, such light being concentrated thereon by means of a suitable mirror or lens, if desirable; the mirror being preferably made of nickel chromium steel, or the light may be applied directly to the aperture or slit without the intervention of a mirror or lens, if desirable. The film containing the so-called sound track may be moved at a uniform speed past the aperture or slit by any well-known means, the gearing effecting this operation being actuated in any suitable or well-known manner from the cinematograph projector mechanism and the light passing through the film is varied in intensity by the varying density of the so-called sound image photographed on the sound track of the film before reaching a photo-electric cell or other known device.

The light passing through the film varies the resistance of the photo-electric cell or other known device and this varies the electric current passing through it by which sounds are produced in the well-known or equivalent manner. The source of illumination, which may be an incandescent electric lamp, is placed preferably near the centres of two rings of steel or of other suitable material, and in the case where a mirror is used, it may also be placed within the said rings and held by any suitable means to focus the light rays on a slit hereinafter called the film slit in the housing containing the supports for the said rings. I do not bind myself to this particular position of the source of illumination, and in some circumstances consider it may be desirable to accommodate the photo-electric cell or other known device within the rings aforesaid. The before mentioned rings are preferably horizontally disposed on vertical axes, and as they are preferably eccentric to each other and one ring is preferably smaller in diameter than the other, in such case each ring has its own central axis. The rings are free to rotate independently of each other and at the same or varying speeds relative to each other as is found most effective for the purpose of keeping the before-mentioned film slit clear for the passage of light.

The rings are made as large in diameter as is practical and I find that 4" and 4½" are diameters which work satisfactorily, but these diameters may be varied to suit particular conditions and are rotated by gearing from the projector mechanism at any suitable speed for the purpose required. I do not bind myself to any particular speed, but as an instance I find that 100 revolutions per minute work well. The upper ring may project slightly nearer to the film slit than the lower one, or the lower ring may be slightly bevelled so that its upper edge is of less diameter than its lower edge, so that foreign matter brought over by the film will not be deposited on the upper edge of the said ring.

The rings are preferably eccentric to one another, and the upper one of smaller diameter than the lower one, as by this means the upper periphery of the lower ring can be kept clean by a wiper applied to the upper edge of the lower ring, and in the same manner a wiper can be applied to the lower edge of the upper ring. The said rings are adjustable in that they can be brought closer to or farther away from each other so that the width of the film slit through which the light passes to the sound track can be made wider or narrower in a vertical direction, the horizontal width being fixed by the housing aforesaid to the required width of the sound track of the film.

The said rings are preferably mounted on ball or other anti-friction bearings, and vertical adjustment is made by fine threaded screws or other like means.

Instead of the source of illumination being centrally situated in the circular space in the inner or central side of the rings, I may arrange a powerful light above or below the said rings, or I may take light from the arc lamp of the projector itself, the said light being directed by suitable mirrors, prisms, or lenses on to the aperture or slit aperture or film slit aforesaid.

By my invention, an aperture or film slit of less than one half of one thousandth part of an inch in vertical width can be used.

The rings are preferably made of stainless steel hardened and ground accurately to fine limits. The drawing may be taken as diagrammatic as showing one way of carrying out my invention. Considerable variation in construction can be made without departing from the essential features of my invention. My invention enables an aperture or slit having less than one thousandth of an inch in width to be used in open air without danger of being clogged or blocked with small particles by means of travelling edges forming the slit travelling preferably independently and preferably at different rates of speed from each other with means for cleaning the edges automatically while in use. Instead of rings, travelling bands or flexible rings may be used to form the edges of the aperture or film slit. I do not advocate this as being more costly and difficult to adjust.

Figure 2:
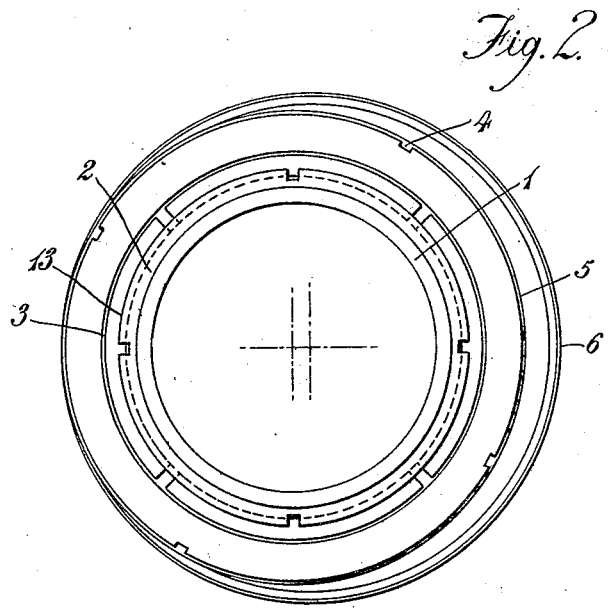

Referring to the drawing, the various parts of the apparatus are indicated by reference lines numbered in the usual manner. Figure 1 shows a section of the apparatus, and Fig. 2 is a top plan view of the housing and rings. In the figures, at 1 is shown the housing or support on which is or are mounted the rings and driving mechanism. The upper ring is mounted on a sleeve No. 2 which is internally threaded to engage with a thread cut on the upper portion of the housing, said sleeve on being rotated enabling the ring No. 5, the ball bearings No. 12 and the locking rings No. 3 and No. 4 to be advanced toward or retreated from the lower ring No. 6, so that the vertical width of the aperture through which light emission takes place can be adjusted, ball bearings No. 12 and locking rings therefore are also provided for the lower ring No. 6.

An opening or slot is provided in the housing at No. 15 to allow the light from the exciter lamp No. 9 to impinge on the opposed edges of the rings at the point where the sound track passes the same, the edge of the film containing the sound track being shown at the vertical dotted line No. 16.

The photo-electric cell or other equivalent device is shown at No. 10, the light reaching this after passing through the film.

The cleaning pads are shown mounted on a spring blade device No. 14, but I do not confine myself to this construction as I may use two separate spring members holding brushes on the line.

In carrying my invention into effect for the purposes of recording sounds photographically, I utilize rings of nature and construction similar to those hereinbefore described, and instead of placing an exciter lamp within these rings, I utilize this space for an electric lamp whose light can be controlled by the variations of current passing through a microphone in any well-known manner, in which case the unexposed cinematograph film will be passed before the film slit in the same manner as when reproduction is being effected, and the whole enclosed in a light-proof casing (or camera) whereby the light from the lamp aforesaid is confined to the film slit, which in this case is used for producing the latent sound image on the film.

What I claim is:

1. In sound-reproducing apparatus, the combination of elements having opposed edges forming a light-transmitting slit, means for moving said elements in the planes of their respective opposed edges, and cleaners continuously engaging said edges whereby movement of the elements will effect removal of deposits.

2. In sound-reproducing apparatus, the combination of rings having opposed edges forming a light-transmitting slit, means for rotating the rings in the planes of their edges, and cleaners bearing upon said edges.

3. In sound-reproducing apparatus, the combination of rings of different diameters having edges opposed at one point to form a light-transmitting slit, means for rotating the rings in the planes of said edges, and cleaners bearing on said edges.

4. In sound-reproducing apparatus, the combination of horizontally disposed rings having their edges opposed to form a light-transmitting slit, means for rotating the rings in horizontal planes, means for adjusting the rings vertically, and cleaners bearing upon the opposed edges of the rings.

HARRY BENWELL STOCKS.